United States Patent
Matsuda

(10) Patent No.: US 7,196,996 B2
(45) Date of Patent: Mar. 27, 2007

(54) OPTICAL DISK APPARATUS AND CONTROL METHOD THEREOF

(75) Inventor: Takashi Matsuda, Tokyo (JP)

(73) Assignee: Hiatchi-LG Data Storage, Inc., Tokyo (JP)

( * ) Notice: Subject to any disclaimer, the term of this patent is extended or adjusted under 35 U.S.C. 154(b) by 574 days.

(21) Appl. No.: 10/781,711

(22) Filed: Feb. 20, 2004

(65) Prior Publication Data
US 2006/0013091 A1    Jan. 19, 2006

(30) Foreign Application Priority Data
Sep. 4, 2003    (JP)    ............................. 2003-312255

(51) Int. Cl.
*G11B 20/10*    (2006.01)
(52) U.S. Cl. .................................... 369/53.26; 369/116
(58) Field of Classification Search ............... 369/53.1, 369/53.26, 59.1, 116; *G11B 20/10*
See application file for complete search history.

(56) References Cited

U.S. PATENT DOCUMENTS 5,274,622 A  *  12/1993  Kono ........................ 369/116

6,671,248 B2 * 12/2003 Miyabata et al. ........... 369/116

FOREIGN PATENT DOCUMENTS

JP    2000-206435    7/2000
JP    2002-16315    1/2002

* cited by examiner

*Primary Examiner*—A M Psitos
(74) *Attorney, Agent, or Firm*—Antonelli, Terry, Stout and Kraus, LLP.

(57) ABSTRACT

In an optical disk apparatus, recording information by irradiating a laser light from a laser diode LD upon a recording surface thereof, while rotationally driving an optical disk by means of a spindle motor 207, being provided with a front monitor diode FMD for monitoring the laser light from the LD therein, a controller portion 205 detects deterioration of the laser diode, including the kink phenomenon, in particular, of loosing the linearity in the driving characteristic thereof caused due to driving under the condition of high temperature, by comparing a laser light output detected by the FMD to that, which is detected previously, within recording operation of the apparatus, and it also makes controls to lower the rotation velocity of the optical disk. This is suitable, in particular, to the optical disk apparatus of a super or ultra-thin type.

12 Claims, 3 Drawing Sheets

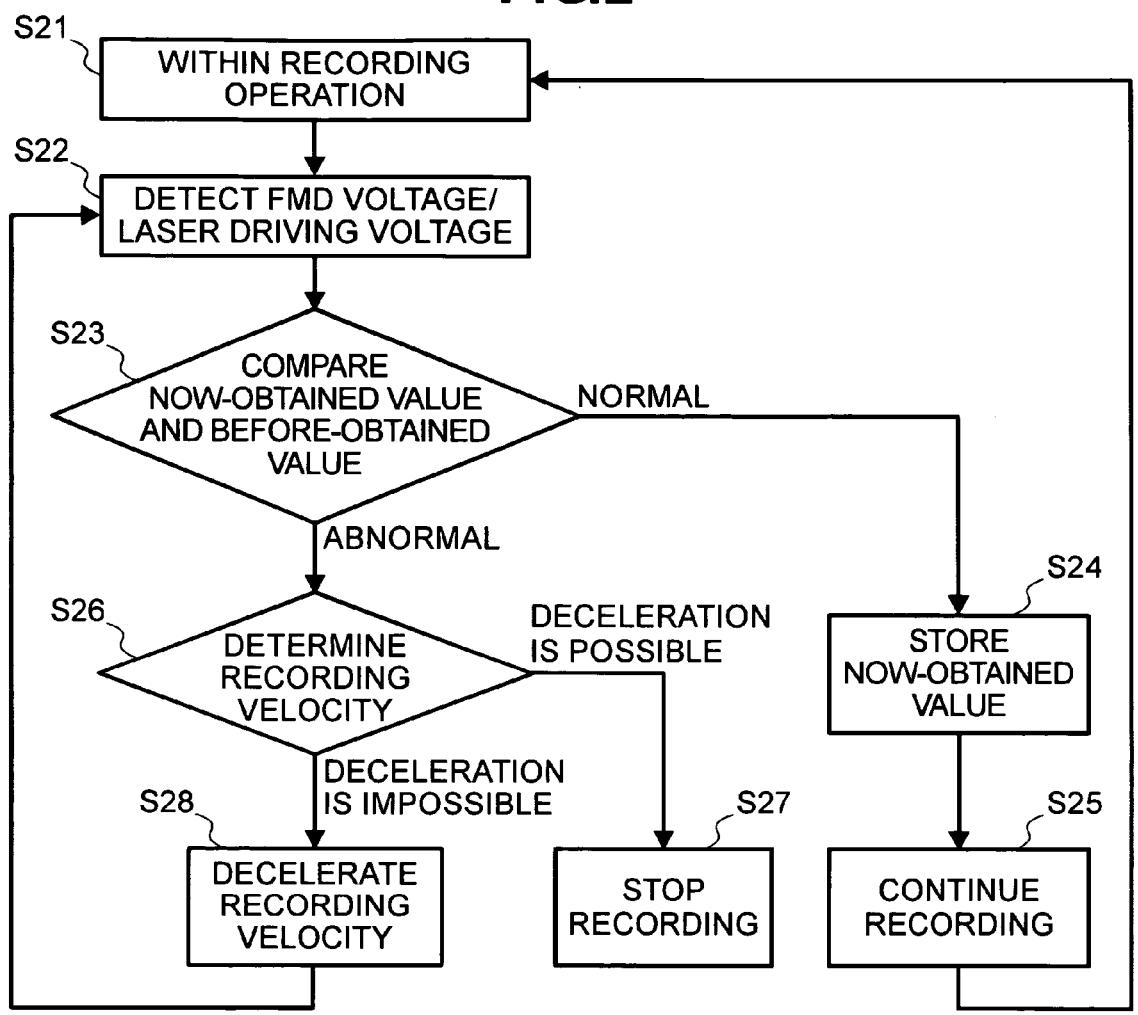
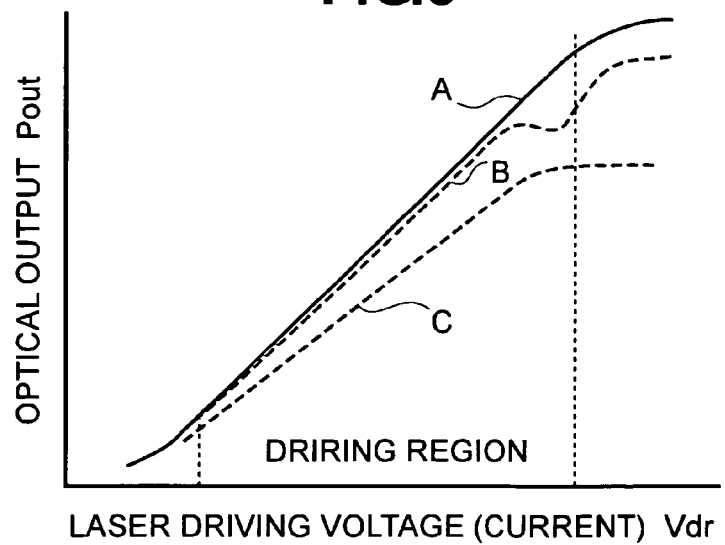

OPTICAL DISK APPARATUS AND CONTROL METHOD THEREOF

BACKGROUND OF THE INVENTION

The present invention relates to an optical disk apparatus and a control method thereof, for recording information on an optical disk of recordable type; such as, a CD-R, a CD-RW, etc., for example, with utilizing a semiconductor laser diode.

Conventionally, in the so-called optical disk apparatus, recording of information is conducted on the optical disk of recordable type, such as, the CD-R (i.e., the CD-Recordable), a CD-RW (i.e., the CD-ReWritable), and a DVD-RAM (i.e., the Digital Versatile Disc-Random Access Memory), for example, with using the laser diode as an optical source thereof.

Also, with such the conventional optical disk apparatus, it is possible to set up a higher linear velocity, to be the linear velocity for performing the recording; such as, the linear velocity of two (2) times, the linear velocity of four (4) times, the linear velocity of eight (8) times . . . , etc., with respect to the linear velocity when reproducing (this is assumed to be a linear velocity of one (1) time), and then the recording of information is performed at the linear velocity of that high speed set up, thereby achieving shortening of the recording time.

Further, as the method for controlling the rotation speed of the optical disk, in particular when recording the information, there are already known the followings: i.e., a CLV (Constant Linear Velocity) control method, for controlling the rotation speed of the optical disk to be constant in the linear speed at the recording position, i.e., an irradiating portion of a laser light, a CAV (Constant Angular Velocity) method, for controlling the rotating angular velocity of the optical disk to be always constant, when recording, and further a control method of exchanging the CLV method and the CAV method appropriately. For example, with the CLV method, the linear velocity when recording is the linear velocity set up, while with the CAV method, the rotation speed is controlled, so that the linear velocity at a recording position, located in a radial direction of the optical disk, does no exceed the rotation speed set up, thereby achieving the record of information.

However, with any of those methods for controlling the rotation speed, an output value of the laser necessary for recording the information increases together with an increase of the linear velocity; therefore, in a case where a high linear velocity is set up, a LD (Laser Diode) comes to be unstable in the operation thereof, and there is a problem that it fails the recording of information.

Then, for example, according to the Patent Document 1 mentioned below, there is already proposed or disclosed an optical disk recording apparatus, wherein it is possible to operate the LD stable even when the linear velocity of high speed is set up, thereby enabling to avoid the failure of recoding information onto the optical disk of the recordable type.

Japanese Patent Laying-Open No. 2002-324318 (2002); in particular in FIGS. 2 and 3 thereof.

Also, such as, a semiconductor laser device and/or a device for controlling an output of a laser diode, for example, which can be applied to a laser printer, a laser scanning apparatus, etc., is also already known, for example, in the following Patent Documents 2 and 3: in which, the laser light emitted by the semiconductor laser is received by the means of an inner photodiode or an outer photodiode, so as to obtain the so-called feedback control upon an intensity of light emission of the laser diode, on the basis of an output of the light eceived, wherein the current supplied to the laser diode is prevented from becoming excessive, thereby preventing the laser diode from deterioration thereof.

Japanese Patent Laying-Open No. 2000-206435 (2000); in particular in FIGS. 2 and 3 thereof, and Japanese Patent Laying-Open No. 2002-16315 (2002); in particular in FIG. 3 thereof.

With such the conventional technologies as was mentioned above, however, in particular, with such the optical disk recording apparatus and a program for controlling the optical disk recoding apparatus, which are described in the former, i.e., the Patent Document 1 mentioned above, wherein while memorizing a maximum value for enabling a stabile operation of the laser diode in advance, and there is provided a means for calculating out an appropriate output value of the laser, responding to the linear velocity set up, to be compared with that maximum output value memorized in advance, and in a case where it is equal or greater than that, it calculates/designates the linear velocity set up to be less than that set-up value thereof. With this, however it is impossible to detect the deterioration of the laser diode irradiating the light beam upon the optical disk when recording information thereon, and therefore it is also impossible to achieve protection of the laser diode, as well as, to deal with such the deterioration accompanying therewith, in particular, in the recording quality thereof.

On the other hand, with such the semiconductor laser device and/or the controller device for controlling an output of the laser diode, being applied into the laser scanning apparatus, which are described in the latter, i.e., the Patent Documents 2 and 3 of the conventional arts mentioned above, when the output of the laser diode is abnormal in the condition thereof, the laser diode stops the output thereof; therefore when applying this into the optical disk apparatus, it is impossible to continue the recording operation, and for this reason, there is a drawback that it brings about the deterioration in the recording quality.

BRIEF SUMMARY OF THE INVENTION

Then, an object is, according to the present invention, by taking the drawbacks of the conventional arts mentioned above into the consideration thereof, to provide an optical disk apparatus and a controlling method thereof, for enabling to deal with the deterioration of the laser diode, etc., in the optical disk apparatus, and thereby achieving an improvement of the recording quality thereof, as well as, the protection of the laser diode.

Namely, with the laser diode, i.e., a semiconductor element, generally, an intensity of the laser output thereof shows characteristics of increasing/decreasing in relation to the drive current (or voltage) thereof. However, due to such the deterioration of the laser diode, or in particular, under the circumferences of being used in high temperature, a linearity (i.e., a linear relationship) is broken or lost in a region where the output is equal or greater than a certain level, which is established between the drive current and the output of the laser diode, thereby causing a phenomenon, being so-called a "kink". Further, such phenomenon is remarkable, in particular, with an optical disk apparatus, such as, being so-called a type of super-thin, wherein air circulation is insufficient in an inside thereof accompanying with the thin-sizing thereof.

Therefore, another object is, according to the present invention, to provide an optical disk apparatus and a controlling method thereof, for enabling an appropriate execution upon the laser power control and/or the recording velocity control of the optical disk apparatus, through detection of occurring the phenomenon mentioned above, being so-called the "kink", during the recording operation thereof, for the purpose of dealing with such the deterioration of the laser diode provided in the optical disk apparatus, thereby achieving an improvement of the recording quality thereof, as well as, the protection of the laser diode.

In more details, according to the present invention, for accomplishing those objects mentioned above, first of all, there is provide an optical disk apparatus for recording information onto an optical disk, comprising: a laser diode configured to emit a laser light therefrom, to be irradiated upon a recording surface of the optical disk; a rotation driver configured to rotationally drive the optical disk; a monitor device, being position in vicinity of said laser diode, configured to monitor the laser light emitted from said laser diode; and a controller configured to detect an abnormal condition of said laser diode, through time-sequential comparison of an intensity of the laser light emitted from said laser diode when the apparatus performs a recording operation, which is detected by said monitor device, and configured to control a rotating velocity of the optical disk by said rotation driver, depending upon detection of said abnormal condition.

And, according to the present invention, also for accomplishing the object mentioned above, there is provided a control method of an optical disk apparatus for recording information onto an optical disk, comprising the following steps of: detecting an abnormal condition of a laser diode, through time-sequential comparison of an intensity of the laser light emitted from said laser diode when the apparatus performs a recording operation, which is detected by a monitor driver, disposed in vicinity of said laser diode, configured to monitor the laser light emitted from said laser diode; and controlling a rotating velocity of the optical disk, depending upon detection of said abnormal condition.

In addition thereto, according to the present invention, in the optical disk apparatus or the control method as described in the above, wherein said controller may detect the abnormal condition of said laser diode, by using a linear characteristic between driving current or voltage and a light emitting output thereof, or said controller may reduce the rotation velocity of the optical disk when detecting said abnormal condition.

Further, according to the present invention, the optical disk apparatus or the control method as described in the above, preferably, further comprises at least a memory configured to memorize an intensity of the laser light, which is emitted from said laser diode when conducting the recording operation, wherein said controller detects the abnormal condition of said laser diode, by comparing a present laser light intensity, which is detected by said monitor device, and a previous laser light intensity, which is memorized in said memory, or said controller controls said rotation velocity, further by detecting the rotation velocity of the optical disk, thereby to determine if said rotation velocity can be lowered or not thereupon. Or, according to the present invention, said controller stops the rotation of said optical disk, when determining that said rotation velocity cannot be lowered. And, according to the present invention, the optical disk apparatus as described in the above, said optical disk apparatus is a thin-type having a size from 12.7 mm to 9.5 mm in thickness thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 2 is a flowchart for showing control operation of the optical disk apparatus mentioned above, according to the present invention;

FIG. 3 is a view for showing an example of an output characteristic of a laser diode, for explaining an "abnormality" in the optical disk apparatus mentioned above, according to the present invention.

DETAILED DESCRIPTION OF THE INVENTION

Hereinafter, embodiments according to the present invention will be fully explained by referring to the attached drawings.

Figure 4:
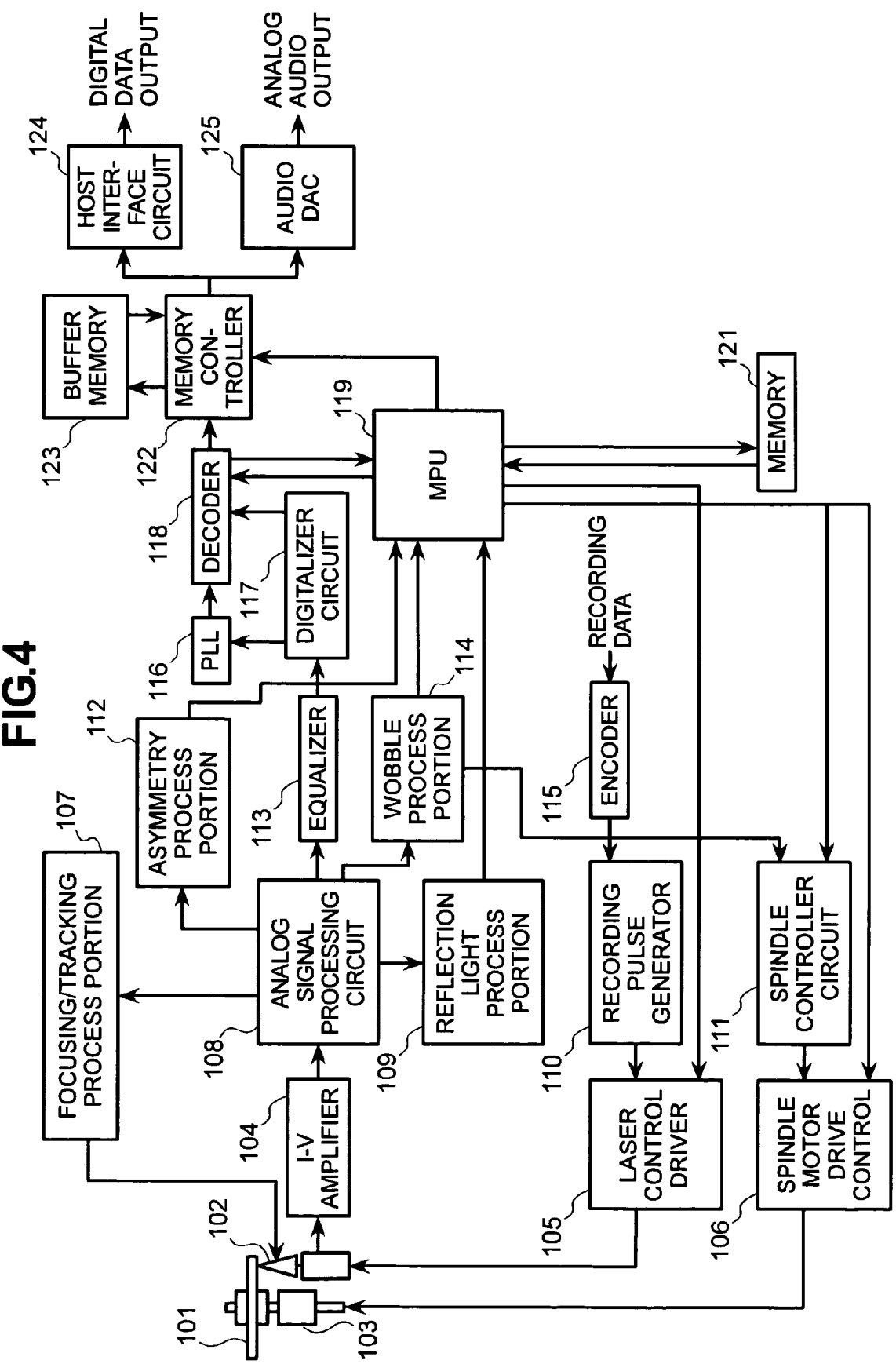
FIG. 4 is a block diagram for showing the entire structure of the optical disk apparatus, according to one embodiment of the present invention.

FIG. 4 is the block diagram for showing the entire structure or configuration of an optical disk apparatus, according to one embodiment of the present invention. In this figure, upon an optical disk 101 of a re-writable recording medium is irradiated a laser beam emitting from an optical pickup 102. Also, a reflection light being reflected upon the optical disk 101 is detected by a photo detector of the optical pickup 102, and an output generated from the photo detector is converted into voltage with in an I-V amplifier 104. However, in the present example, the optical pickup 102 is made up with a semiconductor laser (e.g., a laser diode), an optical system, including an objective lens, etc., a focusing actuator, a tracking actuator, a photo detector, and a lens position sensor, etc., for example.

An output of the I-V amplifier 104 is inputted to an analog signal processing circuit 108, and the output of the I-V amplifier 104 is calculated herein so as to producing a focus error signal, a tracking error signal and a wobble signal, to be inputted into a focusing and tracking process portion 107, and upon the basis of the focus error signal and the tracking error signal, controls are performed on a focusing actuator and a tracking actuator. An RF signal obtained from the analog signal processing circuit 108 is equalized in the waveform thereof in an equalizer, and it is digitized in a digitizing circuit 117, to be inputted into a PLL circuit 116. In the PLL circuit 116, a channel clock is produced from the digitized signal, and it is inputted into a decoder 118. In this recorder 118, the digitized signal is decoded with an aid of the channel clock, thereby demodulating or decoding data. Accordingly, reproduced data can be obtained at an output terminal of the decoder 118.

A reference numeral 109 in the figure depicts a reflection light process portion, for processing the digitized data corresponding to a reflection light, which is obtained from the optical disk 101 when conducting test writing on a test writing area (PCA) of the optical disk 101. An output of this reflection light process portion 109 is inputted into a MPU 119, and a parameter to be set up into a laser driver 105 is adjusted finely by means of an output of this MPU 119. Accordingly, with using an output of the reflection light process portion 109, it is possible to perform a running OPC (Optimum Power Calibration). A reference numeral 112 depicts an asymmetry process portion, which produces a beta (β) value for each recording power from the RF signal outputted from the analog signal processing circuit 108. Accordingly, by inputting this data into the MPU 119, it is possible to determine an optimum power level upon the basis of the β value. Further, within the MPU 119 are conducted; such as, supply of a clock and/or a control signal to each circuit, processing of an interruption signal, and control of farm ware (F/W), etc. A reference numeral 114 depicts a wobble process portion, which produces a wobble period or cycle from a wobble signal produced in the analog signal processing circuit 108. This data is inputted into the MPU 119, and also into a spindle controller circuit 111. The wobble cycle is used in producing of the clock and the spindle control. Also, synch frame timing within a sector can be produced by this wobble cycle.

Record data is modulated (8/16 modulation) in the encoder 115, and is inputted into a recording pulse generator 110. Within the recording pulse generator 110, NRZI is produced from the modulation data inputted from the encoder 115 and is outputted to a laser control driver 105. The laser control driver 105 converts the inputted NRZI signal into a light emission waveform, thereby controlling the power level of a semiconductor laser (i.e., a laser diode, but not shown in the figure) and pulse width of light emission.

The spindle controller circuit 111 produces a frequency for driving a driver, by the wobble signal inputted form the wobble process portion 114 and the signal inputted from a fixed frequency generator of the MPU 119. A spindle control driver 106 converts a constant frequency into voltage, being dependent upon a double-speed, which is inputted from the spindle controller circuit 111 when CAV controlling, thereby driving the spindle motor 103. Also, when CLV controlling, a variable frequency generated upon the basis of the wobble signal frequency, which is inputted from the spindle controller circuit 111, is converted into voltage, thereby to be supplied to the spindle motor 103.

In the decoder 118, the digitized signal is decoded by the channel clock, which is produced in the PLL circuit 116, thereby decoding the data, and at the same time, the decoder 118 also makes a report to the MPU 119 on whether a correction error is in that decoded data or not, as well as, of completion of the decoding, for each sector address. Upon the report from the decoder 118, the MPU 119 memorizes a table in a memory 121, indicative of relationships: such as, between presence of correction error of the data and an error generation frequency, which is calculated out with using thereof, a read retry number, as well as, an error generation frequency and the read retry number, which are produced in advance.

Also, normal data decoded in the decoder 118 and data including the correction error therein are inputted into a memory controller 122, being attached with address information, and are inputted into a buffer memory 123 upon the basis of control of this memory controller 122. The MPU 119 can cancel or delete the data including the correction error, which are memorized in the buffer memory 123, by inputting a cancel instruction to the memory controller 122. Accordingly, in the buffer memory are memorized the normal data, the normal data, which can be obtained through the read retry and are replace by the data including the correction error, and the data including the correction error when the normal data cannot be obtained through the read retry. The MPU 119 can select an outputting method of the data memorized in the buffer memory 123. Upon the basis of an instruction issued from the MPU 119 to the memory controller 122, the memory controller 122 inputs the data memorized in the buffer memory 123 into a host interface circuit 124 and an audio DAC 125. As a result of this, a digital data signal is outputted from the host interface circuit 124, while an analog audio signal from the audio DAC 125.

Figure 1:
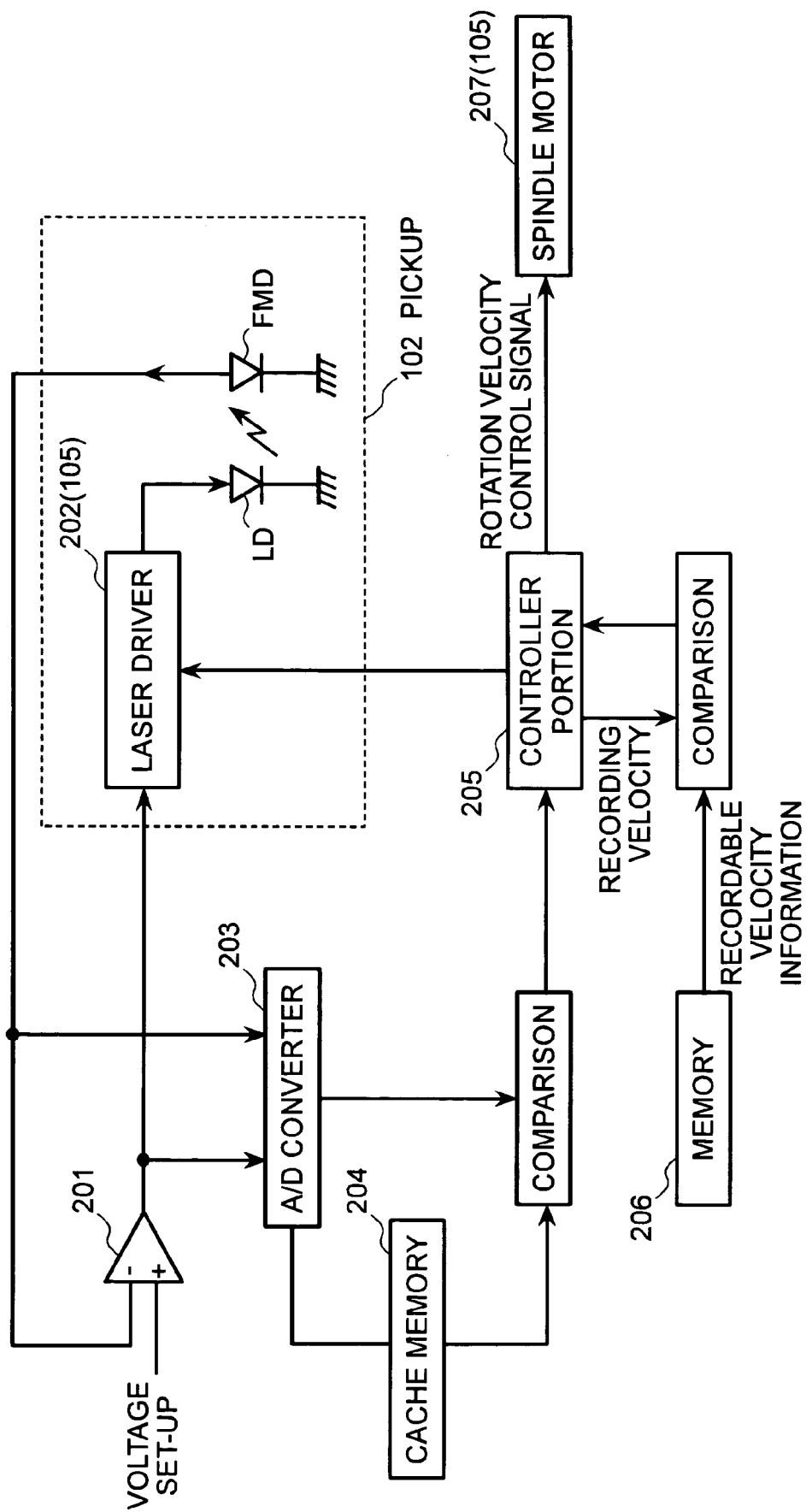
FIG. 1 is a view for showing the structure of an optical disk apparatus, according to the present invention, mainly around an optical pickup thereof, as to be the feature thereof.

Next, in FIG. 1 attached are shown portions relating to the present invention, in the optical disk apparatus, the entire structure of which is explained in the above; in particular, those around the optical pickup 102 thereof. Namely, within the pickup, there are provided a semiconductor element for outputting a laser light to conduct the recording/reproducing on the optical disk; such as, a laser diode LD, for example, and also, a detector element disposed adjacent thereto, for detecting an output (an optical intensity) of this laser diode; such as, a front monitor diode (FMD).

A detection signal detected by this front monitor diode (FMD) is, as shown in the figure, inputted to a negative input terminal of a comparator 201, to be compared with a predetermined voltage of a set-up value, thereby obtaining feedback control of the driving voltage (or current) to the laser diode LD through the laser driver 202. At the same time, the detection signal from this front monitor diode FMD is inputted into an A/D converter 203 together with an output of the comparator 201 mentioned above, thereby being converted into digital signals. With this, with the driving voltage of the laser driver 202 when recording onto the optical disk, a return light level (i.e., an actual intensity of optical output from the laser diode LD) back to the front monitor diode FMD can be monitored. However, though will be mentioned later, this A/D converter 203 memorizes the value of the driving voltage (or current) to the laser diode and the value of the voltage (e.g., detection signal) of the front monitor diode FMD, which are converted into the digital values after obtaining thereof, as was in the above, into a cache memory 204.

On the other hand, a controller portion 205 compares the driving voltage of the laser diode LD from the A/D converter 203 mentioned above and the voltage of the front monitor diode FMD to the LD driving voltage and the FMD voltage of the previous time, which are memorized within the cache memory 204 mentioned above, thereby determining on whether deterioration occurs or not on the laser diode; in particular, on whether a phenomenon, being so-called the kink, occurs or not, where the linearity is lost between the driving voltage and the laser output. As a result of this, when it is determined that the phenomenon, being so-called the kink, occurs, the controller portion 205 changes (i.e., lowers) the driving voltage, so that the laser diode LD can be driven within a power region where it can be driven safely much more, through the laser driver 202 mentioned above, and it also compares the information of the recordable velocity, which is memorized within the memory 206 in advance, to the present recording velocity at the present, so as to determined the optimal rotation velocity where the recording can be made with an output power (i.e., a low power) of the laser diode LD which is changed (or lowered) accompanying with change (i.e., lowering) of the driving voltage, thereby outputting a rotation velocity control signal corresponding thereto, to the spindle motor 207.

Hereinafter, explanation will be given in more details about the control operation within the circuit shown in FIG. 1 mentioned above, on which brief explanation was given in the above. However, the processes shown in this flowchart is executed, repetitively, for example, at a cycle of around one (1) second, by the MPU 119 shown in FIG. 3.

In the processes shown in FIG. 2, first of all, it is checked on that the optical disk apparatus is under the recording operation (step S21). Namely, this process is provided to deal with the problem, which is caused during when the apparatus is recording on the optical disk, as was mentioned above. Thereafter, upon the basis of an output of the A/D converter 203 are detected two (2) values; i.e., the voltage of the front monitor diode FMD (such as, FMD voltage) and the driving voltage of the laser diode LD (such as, laser driving voltage) (step S22).

Next, comparison is made between those two (2) now-obtained values, which are detected in the above, and the two (2) the before-obtained values, which are detected in advance. Namely, comparison is made between the values of the FMD voltage and the laser driving voltage, which are presently detected, to the values of the previous FMD voltage and the laser driving voltage, which are memorized within the cache memory 204 shown in FIG. 1 mentioned above (step S23). However, in this instance, if there is no such the before-obtained value about the FDM voltage and the laser driving voltage, such as in the case when this process is executed at first time, for example, it is determined to be "normal", and those now-obtained values are memorized in the cache memory 204 mentioned above (step S24). Thereafter, it is confirmed that the optical disk apparatus is still continuing the recording operation (step S25), and then it turns back to the step S21 mentioned above.

Herein, explanation will be given about determination of the presence of "abnormality" in the step S23 mentioned above. Normally, the laser diode shows, so-called, a linear output characteristic, as shown by a solid line "A" in FIG. 3 attached; i.e., increasing the optical output thereof in relation to the laser driving voltage (or current), within the set-up driving range.

However, due to reasons, such as, deterioration of the laser diode, the use under the condition of high temperature, etc., as is shown by a broken line B and C in FIG. 4, the phenomenon, so-called the kink occurs, where the linearity is lost between the laser driving voltage (or current) and the optical output (seethe broken line B). Thus, as was mentioned in the above, when monitoring the driving voltage of the laser diode LD and the voltage of the front monitor diode FMD, there sometimes occurs such a case that the FMD voltage shows a decrease in spite of an increase of the laser driving voltage, for example. However, such the phenomenon is remarkable, in particular, when the optical disk apparatus is of a super-thin type, being 12.7 mm or 9.5 mm in the thickness, for example, and as a reason thereof, it can be assumed that an air flow is restricted within an inside of such the apparatus, accompanying with reduction of the thickness, and therefore, the temperature comes up easily, in particular, in a periphery of the laser diode, as the heat generation source.

According to the present embodiment, when occurring such the phenomenon, it is determined that the "abnormality" exists in the diode, thereby trying to protect the laser diode therefrom, by lowering down the driving range, in particular, an upper limit in a high output region. Also, at the same time to that, also the rotating velocity (i.e., recording speed) of the optical disk is lowered during when recording, in the operation, accompanying with the decrease of the optical output from the laser diode, so as to enable the execution of the recording operation onto the optical disk even if the laser diode is low in the power thereof, thereby improving the recording quality.

Then, in more details, in the step S23 mentioned above, the values of the now-detected FMD voltage and the laser driving voltage are compared to those of the previous FMD voltage and the laser driving voltage, so as to determine on whether the kink phenomenon occurs or not, loosing the linearity between the laser driving voltage and the optical output, or the deterioration occurs or not in the output characteristics, due to the use thereof under the condition of high temperature, with respect to the laser diode under the condition of the recording operation.

Further, when making the determination in the step S23 mentioned above, it is also possible to calculate out a ratio R between the change of the laser driving voltage Vdr and that of the optical output Pout by the flowing equation, for example, thereby to determine the presence of the "abnormality" upon if this ratio stays within a predetermined region or not.

$$R=(Pn-Pn-1)/(Vn-Vn-1) \quad \text{(Eq. 1)}$$

$$Rlow \leq R \leq Rup \quad \text{(Eq. 2)}$$

Herein, "Rlow" indicates the lower limit value of the predetermined region mentioned above, while "Rup" the upper limit value thereof. However, according to the present embodiment, the method should not be restricted only to that mentioned above, and it is also possible to memorize, not only the now-detected values and the before-detected values, but also the values which are detected further before, thereby detecting the deterioration of the output characteristics due to, such as, the kink phenomenon and/or the use under the condition of high temperature, according to the comparison therewith. Or, in a case when the laser driving voltage Vdr does not change, it is possible to determine the presence of the "abnormality" by making comparison only on the change of the optical output Pout to the previous value, so as to determine that the change stays within a predetermined region or not. Furthermore, in such the instance, while detecting the temperature within the apparatus (in particular, within an inside of the pickup), it is also possible to bring the upper and the lower limit values of the predetermined region or the predetermined region itself to be variable depending upon the temperature detected.

And, in a case where it is determined to be "abnormal" in the step S23 mentioned above, the recording velocity is determined at that time (step S26). With this, comparison is made between the recordable velocity, which is memorized within the memory (for example, being defined by F/W within the drive) and the recording velocity which is set up at present, thereby determining on whether a deceleration can be made or not onto the recording velocity. In more details, the velocity which is set up at present is coincident with the lowest one of the recordable velocities, since it is impossible to reduce the recording velocity much lower, therefore it is determined to be "impossible to decelerate", but on the other hand, in the other cases, it is determine to be "possible to decelerate".

Thereafter, in a case where it is determined to be "impossible to decelerate" in the step S26 mentioned above, an enable signal outputted from the controller portion mentioned above is set to be OFF, to distinguish the laser diode, thereby stopping the recording operation (step S27), and then the process is ended. However, herein the enable signal is a signal for selecting an input to be valid/invalid to the laser driver mentioned above. Namely, even if the voltage is set-up for laser light emission of the laser diode from the laser driver, the laser diode does not emit the light if it is invalidated by setting up this enable signal into OFF.

On the other hand, if it is determined to be "possible to decelerate" in the step S26 mentioned above, the controller portion controls the spindle motor, to decelerate the recording velocity down to a speed lower than that by one step (step S28), and thereafter, it turns back to the step S22 mentioned above. With this, the laser driver is able to reduce the optical output thereof, due to the fact that the recording velocity is decelerated. Namely, with the driving voltage within the region where neither such the kink phenomenon nor the deterioration in the output characteristics occurs, it is possible to bring the laser diode to emit the light safely, as well as, to obtain the recording operation of high quality.

Also, according to the present invention, the explanation was given on the assumption that deceleration of the recording velocity is made down to the velocity lower than that by one step in the above, however according to the present invention, it should not be restricted only to that. For example, in a case of a control method of exchanging the CLV method and the CAV method, appropriately, it is needless to say that the deceleration can be made on the recording velocity, such as, exchanging from the CAV (i.e., an angular velocity) to the CLV (i.e., a linear velocity) control, for example.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

As was fully described in the above, with the optical disk apparatus and the control method of the optical disk apparatus, according to the present invention, it is possible to deal with the deterioration of the laser diode, or the like, in the super or ultra-thin type, such as, having a size from 12.7 mm to 9.5 mm in thickness thereof, for example, and also to obtain an improvement on the recording quality thereof, as well as, obtaining the protection of the laser diode, thereby achieving superior effects.

What is claimed is:

1. An optical disk apparatus for recording information onto an optical disk, comprising:
    a laser diode configured to emit a laser light therefrom, to be irradiated upon a recording surface of the optical disk;
    a rotation driver configured to rotationally drive the optical disk;
    a monitor device, being position in vicinity of said laser diode, configured to monitor the laser light emitted from said laser diode; and
    a controller means configured to detect an abnormal condition of said laser diode, through time-sequential comparison of an intensity of the laser light emitted from said laser diode when the apparatus performs a recording operation, which is detected by said monitor device, and configured to control a rotating velocity of the optical disk by said rotation driver, depending upon detection of said abnormal condition.

2. The optical disk apparatus as described in the claim 1, wherein said controller detects the abnormal condition of said laser diode, by using a linear characteristic between driving current or voltage and a light emitting output thereof.

3. The optical disk apparatus as described in the claim 1, wherein said controller reduces the rotation velocity of the optical disk when detecting said abnormal condition.

4. The optical disk apparatus as described in the claim 1, further comprises at least a memory configured to memorize an intensity of the laser light, which is emitted from said laser diode when conducting the recording operation, wherein said controller detects the abnormal condition of said laser diode, by comparing a present laser light intensity, which is detected by said monitor device, and a previous laser light intensity, which is memorized in said memory.

5. The optical disk apparatus as described in the claim 1, wherein said controller controls said rotation velocity, further by detecting the rotation velocity of the optical disk driven by said rotation driver, thereby to determine if said rotation velocity can be lowered or not thereupon.

6. The optical disk apparatus as described in the claim 5, wherein said controller stops the rotation of said optical disk driven by said rotation driver, when determining that said rotation velocity cannot be lowered.

7. The optical disk apparatus as described in the claim 1, wherein said optical disk apparatus is a thin-type having a size from 12.7 mm to 9.5 mm in thickness thereof.

8. A control method of an optical disk apparatus for recording information onto an optical disk, comprising the following steps of:
    detecting an abnormal condition of a laser diode, through time-sequential comparison of an intensity of the laser light emitted from said laser diode when the apparatus performs a recording operation, which is detected by a monitor driver, disposed in vicinity of said laser diode, configured to monitor the laser light emitted from said laser diode; and
    controlling a rotating velocity of the optical disk, depending upon detection of said abnormal condition.

9. The control method of the optical disk apparatus, as described in the claim 8, wherein the abnormal condition of said laser diode is detected, by using a linear characteristic between the driving current or voltage and the light emitting out of said laser diode.

10. The control method of the optical disk apparatus, as described in the claim 8, wherein the rotation velocity of the optical disk is lowered when detecting said abnormal condition.

11. The control method of the optical disk apparatus, as described in the claim 8, wherein the abnormal condition of said laser diode is detected, by comparing a present laser light intensity, which is detected by said monitor driver, and a previous laser light intensity, which is memorized in a memory.

12. The control method of the optical disk apparatus, as described in the claim 8, further detecting the rotation velocity of the optical disk, thereby to determine on whether said rotation velocity can be lowered or not, said rotation velocity of the optical disk is lowered if determining that it can be lowered, and it is stopped if determine to be impossible, on the other hand.

* * * * *